United States Patent [19]

Hertz, Jr.

[11] 4,270,761

[45] Jun. 2, 1981

[54] SEAL FOR GEOTHERMAL WELLS AND THE LIKE

[75] Inventor: Daniel L. Hertz, Jr., Red Bank, N.J.

[73] Assignee: Seals Eastern Inc., Red Bank, N.J.

[21] Appl. No.: 99,278

[22] Filed: Dec. 3, 1979

[51] Int. Cl.$^3$ ............ E21B 33/124; F16J 15/12
[52] U.S. Cl. ................. 277/12; 428/36; 166/147; 166/191; 277/165; 277/205; 277/230
[58] Field of Search ............ 166/147, 191; 428/36, 428/396, 526, 527; 277/DIG. 6, 12, 165, 205, 212 C, 227–230, 234, 235 R, 235 A

[56] References Cited

U.S. PATENT DOCUMENTS

| | | | |
|---|---|---|---|
| 2,379,138 | 6/1945 | Fitting et al. | 166/191 X |
| 2,512,801 | 6/1950 | Kinney et al. | 166/191 X |
| 2,537,066 | 1/1951 | Lewis | 166/147 X |
| 2,681,705 | 6/1954 | Tappmeyer | 166/147 X |
| 2,942,668 | 6/1960 | Maly et al. | 277/165 X |
| 3,219,503 | 11/1965 | Blair | 277/205 X |
| 3,719,366 | 3/1973 | Pippert | 277/230 X |
| 3,770,711 | 11/1973 | Hartig et al. | 428/36 |
| 4,156,533 | 5/1979 | Close et al. | 277/229 |

FOREIGN PATENT DOCUMENTS 648345 9/1962 Canada .................... 277/230

*Primary Examiner*—Robert S. Ward, Jr.
*Attorney, Agent, or Firm*—Alan H. Levine

[57] ABSTRACT

A seal for use in high temperature, aggressive environments, such as a geothermal well, including a ring-shaped element of a polymer, such as tetrafluoroethylene/perfluoro (alkyl vinyl ether) copolymer, which is substantially crystalline at room temperature, has a crystalline melt temperature above 500° F., and melts at a temperature above 650° F. The polymer has a molecular weight of at least about 400,000 and is characterized by molecular chain entanglements to the extent of an average of at least about ten physical entanglements per chain when the polymer is in an amorphous state. The polymer element expands in response to the high temperatures within the well, so that when the seal is located in the annular space between concentric tubular well members, it expands to press tightly against both members. The polymer element is an initially flat ring formed by heat and pressure into a non-flat ring shape, whereby upon being heated by the well temperature the element tends to return to its initial shape. The seal includes a ring-shaped back-up member contacting one face of the polymer element, the back-up member being formed of a mesh of knitted metal wire.

6 Claims, 13 Drawing Figures

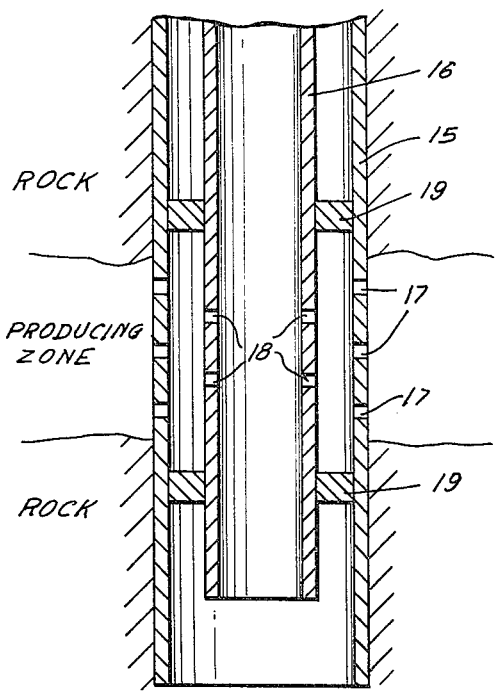
FIG. 1
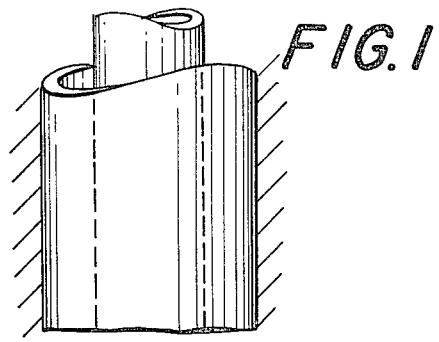
FIG. 4
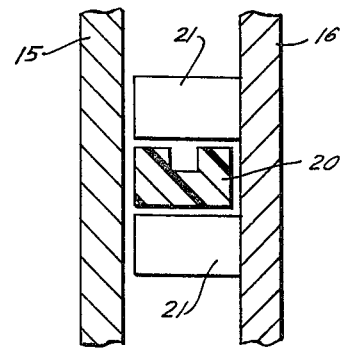
FIG. 5
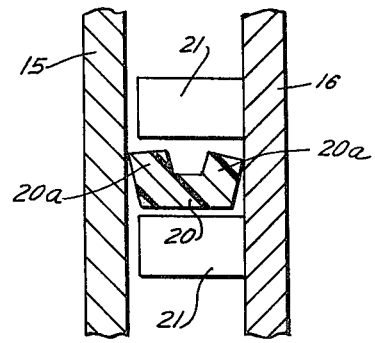
FIG. 2
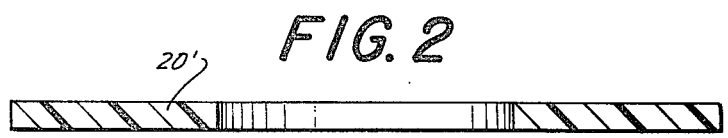
FIG. 3
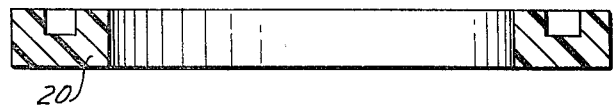

SEAL FOR GEOTHERMAL WELLS AND THE LIKE

This invention relates to seals of polymeric material, and more particular to such a seal useful in a geothermal well, or other wells wherein seals encounter high temperatures and agressive environments.

Recently, there has been renewed interest in using the internal heat of the earth as an energy source. Steam and hot water extracted from the earth can be used to drive turbines in electric power plants. Ordinarily, access to this geothermal energy is obtained by drilling a well in underground rock strata, similar to an oil well, and lining the well with a series of concentric tubular casings of progressively smaller and smaller diameter. The annular space surrounding each casing is filled by injecting into it cement under high pressure, after which the cement is allowed to cure. This prevents uncontrolled escape of the high temperature/high pressure fluid into the permeable geological strata through which the well is drilled. A pipe, usually called "tubing", is inserted into the casings for transporting geothermal fluids to the surface. The annular space between the tubing and casing is sealed by a seal usually referred to as a "packer". This seal or packer must not only effect an initial seal, but it must also maintain the seal throughout the thermal expansion and contraction of the tubing. Static sealing in a geothermal environment has been achieved using materials such as asbestos; however, relative motion between the casing and the tubing destroys the sealing effect of such packers.

Elastomeric materials have the ability to maintain seals despite relative movement between the surfaces being sealed, and these materials have served successfully in oil well applications where temperatures do not exceed 250° F. However, in geothermal applications, temperatures reach as high as 650° F., and at such temperatures most known polymers used for sealing either harden or lose their elasticity to such an extent as to become useless for performing a sealing function. In addition to high temperatures and relatively moving sealing surfaces, such seals also encounter aggressive environments containing, for example, hydrogen suflide, steam, hydrocarbons, and ammonia, making certain polymers useless for the purpose.

Packers of the type under discussion can be broken down into two general types, namely, those which are mechanically pressurized, and those which respond to the pressure and temperature of the system being sealed. With the former type, after the packer has been placed at the desired location, the elastomeric sealing material is expanded mechanically to a new diameter. Due to thermal expansion, the sealing pressure can rise to many times the nominal sealing pressure, with the result that either the metal of the sealing mechanism fails or the seal extrudes out of its confined region and fails. In addition to these disadvantages, the well size is limited by the maximum diameter of mechanical seal available. For these reasons, the present invention does not relate to such mechanically-activated seals.

It is a general object of the present invention to provide a seal, of the type which responds to the temperature and pressure of the system being sealed, capable of maintaining a secure seal in a high temperature environment, such as a geothermal well.

It is another object of the invention to provide such a seal including a back-up member of special character for preventing extrusion of the seal material into the clearances between the casings.

A special feature of the invention involves the use, as the sealing material, of a polymer having a great many molecular chain entanglements, also referred to as "pseudo crosslinks", which maintain the integrity of the seal even at the extremely high temperatures such as those encountered in geothermal wells.

Additional objects and features of the invention will be apparent from the following description in which reference is made to the accompanying drawings.

In the drawings:

FIG. 1 is a schematic cross-sectional view of the lower end of a geothermal well;

FIG. 2 is a cross-sectional view through a polymer preform seal element;

FIG. 3 is a cross-sectional view through the seal element after shaping under heat and pressure;

FIG. 4 is a fragmentary cross-sectional view showing the shaped seal element in sealing position before being subjected to high temperature;

FIG. 5 is a view similar to FIG. 4 after the seal element is subjected to high temperature;

Figure 6:
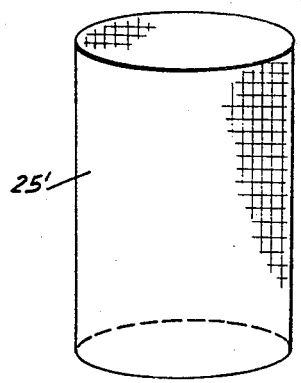
FIGS. 6–10 illustrate schematically a sequence of steps in forming a back-up member for the sealing element of FIGS. 3–5.

FIG. 1 illustrates an example of the lower end of a geothermal well. The well has been drilled through a producing zone, containing geothermal fluids, e.g., steam and/or hot water, rock strata being above and below the producing zone. The well is lined with a casing 15 which may be cemented in place to seal the annular space between the outer surface of the casing and the drilled hole. Within casing 15 is a tubing 16 for transporting geothermal fluids from the producing zone to the surface. The casing and tubing are formed with perforations 17 and 18, respectively, at the level of the producing zone to admit geothermal fluids to the interior of tubing 16.

To prevent flow of geothermal fluid along the length of the annular space between casing 15 and tubing 16, an annular seal 19 is located in that space above the producing zone, and if desired another seal 19 is located in the annular space below the producing zone as well. Each seal 19 must press tightly against the outer surface of tubing 16 and against the inner surface of casing 16 with sufficient force to prevent high pressure geothermal fluids from seeping past the seals. It is the seals 19 to which the present invention relates.

The material of which the seals are made must be resilient, so as to compensate for relative movement between casing 15 and tubing 16, and hence an elastomeric material is ideal from this point of view. In addition, the seal material must be resistant to heat and to the chemicals encountered in geothermal wells. Furthermore, the material must have sufficient tensile strength for maintaining its structural integrity and sealing ability when subjected to geothermal pressures.

As a general rule, known elastomeric materials do not meet these criteria. It is believed that a high percentage of the physical strength of an elastomer is due to thermally-sensitive intermolecular forces, resulting in greatly reduced properties at elevated temperatures. Microvoids in the elastomeric seal created by processing conditions are ideal initiating sites for mechanical failures that occur due to the reduced properties at elevated temperatures. Furthermore, the free-volume of an elastomer increases with temperature, and steam or superheated water saturating this space can cause subsequent sponging or "blowing" on decompression. For unsupported seal areas subjected to a large pressure differential, the deterioration process is continuous leading to rapid premature seal failure. In addition, chemical effects on the seal material can cause premature deterioration.

Therefore, for geothermal requirements, a seal material is needed with is capable of maintaining its ability to perform a sealing function over long periods of time and through a wide range of temperatures. In addition, a seal structure is needed which is capable of sealing over long periods of time at high pressure without extruding into the relatively large annular clearances between the casing and tubing.

A material has been discovered having a unique combination of characteristics making it ideally suited to the requirements of the present invention. The material is tetrafluoroethylene/perfluoro (alkyl vinyl ether) co-polymer sold under the trademark Teflon PFA by E. I. duPont de Nemours and Company. This copolymer retains great tensile strength even at high temperature, as shown in U.S. Pat. No. 3,770,711.

Teflon PFA has a high degree of crystallinity at room temperature and a relatively high molecular weight of about 400,000. Its crystalline melting temperature ($t_m$), at which it changes from a tough plastic to an amorphous rubbery state, is in the range of 520° F. to 555° F., and its melting point is about 760° F., the latter being well above the 650° F. temperature encountered in geothermal environments. Of great importance is the considerable molecular chain entanglements present in this material, there being an average of at least about ten physical entanglements per chain when the copolymer is in its amorphous state. These chain entanglements serve as "pseudo crosslinks", since the randomly-coiled polymer molecules are all intertwined and intertangled with each other. The behavior of the polymer in response to any type of stress is largely a measure of the ease or reluctance with which its molecular chains can disentangle to relieve that stress.

The chain entanglements of the Teflon PFA are important since, due to the physical restraint that they provide, they serve to prevent the molded polymer seal from becoming remolded at the elevated temperatures of a geothermal environment. Moreover, they give the polymer a memory causing the formed seal, when subjected to geothermal temperatures, to return to its original molded shape. This property can be used effectively, as will be apparent from the description to follow.

One way of forming and using a seal according to the present invention is illustrated in FIGS. 2-5. A flat ring-shaped Teflon PFA preform 20' (FIG. 2) is made by raising the temperature of the polymer above its melting point (760° F.), injecting the liquid polymer into a mold, and then cooling. The preform 20' is then shaped, under heat and pressure in a different mold, to produce a ring-shaped seal element 20 (FIG. 3) having a U-shaped cross-section. In forming seal element 20 from preform 20', the temperature of the preform, while in the shaping mold, is raised above the crystalline melting temperature (520° F.-555° F.) of the polymer but below its melting point. The polymer is then cooled in the shaping mold so that at room temperature it retains the sealing element shape shown in FIG. 3.

Sealing ring 20 may then be placed around tubing 16 (FIG. 4) so that it is located in the annular space between tubing 16 and casing 15. Preferably, means such as flanges 21 on tubing 16 retain the sealing ring and prevent its movement longitudinally along the tubing. When the sealing element 21 encounters geothermal temperatures of the order of 650° F. (FIG. 5), the crystalline structure of the polymer melts bringing about an amorphous state. In this condition, the chain entanglements tend to return sealing element 20 to its original flat condition (shown in FIG. 2), by spreading arms 20a of the sealing element, but this movement is restrained by tubing 16 and casing 15. As a result, the arms 20a press against both the tubing and casing creating a tight seal. The extensive chain entanglements also serve to prevent any remolding of the sealing element which would reduce the pressure exerted by arms 20a of the sealing element against the tubing and casing.

Where there is a large clearance between the tubing and casing, it is desirable to provide the sealing element with a back-up member having a high modulus of elasticity. The back-up member does not interfere with the sealing function of the sealing element, but prevents extrusion of the sealing element out of its operative location. One way of forming a back-up member for a sealing element of the type described with reference to FIGS. 2-5 is illustrated in FIGS. 6-10.

Figure 7:
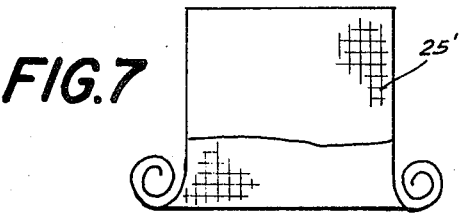
Figure 8:
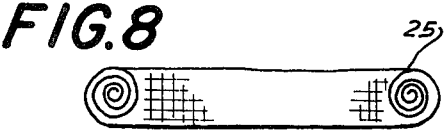
Figure 9:
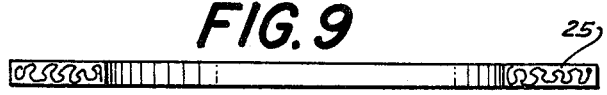
Figure 10:
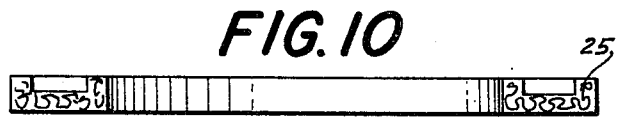
Figure 11:
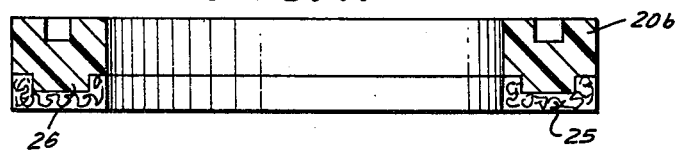
FIG. 11 is a schematic cross-sectional view showing the sealing element and back-up member assembled.

A knitted-metal mesh tube 25' (FIG. 6), such as made by Metex Industrial Products Div. of Metex Corp., Edison, New Jersey, is rolled upon itself, as indicated in FIG. 7, and upon completion of the rolling (FIG. 8) it assumes the shape of a ring 25. The ring is then pressed flat, as shown in FIG. 9, after which it is formed under pressure to give ring 25 a U-shaped cross-section (FIG. 10). Ring 25 is then assembled with a Teflon PFA sealing element 20b (FIG. 11), the latter having a generally U-shaped cross-section and being formed with a ridge 26 fitting snugly into the U-shaped interior of ring 25. In this condition, ring 25 serves as a resilient back-up member for the polymer sealing element 20b. If desired, heat and pressure may be applied to the assembled sealing element 20b and back-up member 25 to permanently join them together.

Figure 12:
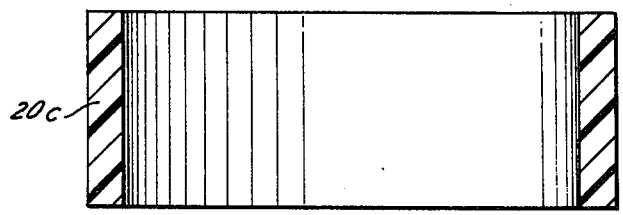
FIG. 12 is a cross-sectional view through an alternatively shaped seal element made from the preform of FIG. 2.
Figure 13:
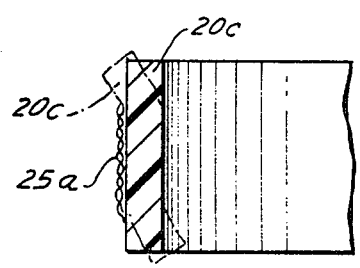
FIG. 13 illustrates the seal element, assembled with a back-up member, in sealing position.

An alternative way of shaping a seal according to the invention is illustrated in FIGS. 12 and 13. In this case, the flat ring-shaped preform 20' (FIG. 2) is shaped under heat and pressure into a hollow cylindrical seal element 20c shown in FIG. 12, the temperature used during the shaping being above the crystalline melting temperature but below the melting point of the polymer. A knitted-metal mesh ring 25 (FIG. 8) is flattened radially (rather than axially as shown in FIG. 9), and the flattened ring 25a (FIG. 13) placed snugly around sealing element 20c. Preferably, sealing element 20c is longer than back-up ring 25a so that it projects above and below ring 25a. When the seal is heated by geothermal temperatures, the tendency of the Teflon PFA to return to its original flat condition (FIG. 2), due to melting of its crystalline structure and its extensive chain entanglements, causes the sealing element 20c to assume the shape shown in dot-dash lines in FIG. 13. In this condition, the upper end will press tightly against the casing 15 and its lower end will press tightly against the tubing 16 (the tubing and ccasing not being shown in FIG. 13).

The invention has been shown and described in preferred form only, and by way of example, and many variations may be made in the invention which will still be comprised within its spirit. Furthermore, although the invention has been illustrated and described with reference to its use in a geothermal well, the seal is useful in any extremely high temperature environment, and is especially advantageous where an agressive environment is encountered as well. It is understood, therefore, that the invention is not limited to any specific form or embodiment insofar as such limitations are included in the appended claims.

I claim:

1. A seal for use in a high temperature environment, such as a geothermal well, the seal including a ring-shaped element of a polymer which is substantially crystalline at room temperature and has a molecular weight of at least about 400,000, the polymer having a crystalline melting temperature above 500° F. and a melting point above 650° F., and the polymer being characterized by molecular chain entanglements to the extent of an average of at least about ten physical entanglements per chain when the polymer is in an amorphous state, the element expanding in response to being heated, by the contents of a well, to a temperature between the crystalline melting temperature and the melting pont of the polymer.

2. A seal as defined in claim 1 wherein the polymer is tetrafluoroethylene/perfluoro (alkyl vinyl ether) copolymer.

3. A seal as defined in claim 1 wherein the well has two concentric tubular members defining an annular space between them, the seal being in the annular space between the members and expanding radially, to increase the force with which it presses against both members, in response to being heated by the high temperature contents of the well.

4. A seal as defined in claim 1 wherein the ring-shaped element is an initially flat ring formed by heat and pressure into a non-flat ring shape, the temperature at which the forming takes place being above that at which the crystalline structure of the polymer melts but below the melting temperature of the polymer.

5. A seal as defined in claim 1 including a ring-shaped back-up member in contact with one face of the polymer element, the back-up member being formed of a mesh of knitted metal wire.

6. A seal as defined in claim 5 wherein the back-up member is a knitted tube rolled upon itself and shaped to the shape of the polymer element.

* * * * *